US 8,002,292 B2

(12) United States Patent
Olson et al.

(10) Patent No.: US 8,002,292 B2
(45) Date of Patent: Aug. 23, 2011

(54) HEATED BANQUET CART

(75) Inventors: Jeffrey C. Olson, Dallas, PA (US);
James Leo Kilgallon, Dallas, PA (US);
Wayne B. Killian, Dalton, PA (US);
Willard J. Sickles, Dalton, PA (US)

(73) Assignee: Metro Industries, Inc., Reno, NV (US)

( * ) Notice: Subject to any disclaimer, the term of this patent is extended or adjusted under 35 U.S.C. 154(b) by 0 days.

(21) Appl. No.: 12/099,445

(22) Filed: Apr. 8, 2008

(65) Prior Publication Data
US 2008/0284297 A1    Nov. 20, 2008

Related U.S. Application Data

(62) Division of application No. 10/915,387, filed on Aug. 11, 2004, now Pat. No. 7,370,867.

(51) Int. Cl.
*B62B 1/00* (2006.01)
(52) U.S. Cl. .............. 280/79.11; 280/47.38; 280/651
(58) Field of Classification Search .......... 280/79.11, 280/47.38, 47.35, 658, 651; 16/35 R, 29, 16/38; 312/218, 219, 107.5; 188/1.12, 74
See application file for complete search history.

(56) References Cited

U.S. PATENT DOCUMENTS

| | | | | |
|---|---|---|---|---|
| 1,633,638 A * | 6/1927 | Jarvis et al. | ............ | 16/35 R |
| 2,188,648 A * | 1/1940 | Bouvier et al. | ............ | 16/35 R |
| 2,345,422 A * | 3/1944 | Peterson | ............ | 15/179 |
| 2,972,163 A * | 2/1961 | Ross et al. | ............ | 16/35 R |
| 3,060,920 A | 10/1962 | Dibert | ............ | 126/276 |
| 3,190,453 A | 6/1965 | Shelley | ............ | 211/59.3 |
| 3,431,584 A | 3/1969 | Maslow | ............ | 16/35 |
| 3,438,364 A | 4/1969 | Galloway | ............ | 126/25 R |
| 3,828,392 A * | 8/1974 | Bolger | ............ | 16/35 R |
| 4,028,773 A * | 6/1977 | Morgan | ............ | 16/35 R |
| 4,037,291 A * | 7/1977 | Huempfner et al. | ............ | 16/35 R |
| 4,108,518 A | 8/1978 | Angst | ............ | 312/305 |
| 4,336,629 A * | 6/1982 | Jarvis et al. | ............ | 16/35 R |
| 4,349,937 A * | 9/1982 | Fontana | ............ | 16/35 R |
| 4,349,938 A * | 9/1982 | Fontana | ............ | 16/35 R |
| 4,479,681 A | 10/1984 | Suzuki | ............ | 308/5 R |
| 4,543,685 A * | 10/1985 | Kassai | ............ | 16/35 R |
| 4,672,944 A | 6/1987 | Curry | ............ | 126/25 R |
| 4,759,098 A * | 7/1988 | Ko | ............ | 16/29 |
| 4,790,610 A | 12/1988 | Welch et al. | ............ | 312/218 |
| 4,875,696 A | 10/1989 | Welch et al. | ............ | 280/47.34 |
| 5,191,675 A * | 3/1993 | Ishikura | ............ | 16/35 R |
| 5,673,983 A * | 10/1997 | Carlson et al. | ............ | 312/218 |
| 5,899,469 A * | 5/1999 | Pinto et al. | ............ | 280/79.11 |
| 6,378,963 B1 * | 4/2002 | Relyea et al. | ............ | 312/218 |
| 6,502,669 B1 * | 1/2003 | Harris | ............ | 188/1.12 |
| 6,725,501 B2 * | 4/2004 | Harris et al. | ............ | 16/35 R |
| 6,735,794 B1 * | 5/2004 | Way et al. | ............ | 16/35 R |

* cited by examiner

*Primary Examiner* — Hau V Phan
(74) *Attorney, Agent, or Firm* — Fitzpatrick, Cella, Harper & Scinto

(57) ABSTRACT

A banquet cart including a cabinet, a plurality of chimneys, an information center, and releasably lockable swivel casters. The plurality of chimneys are positioned inside the cabinet at different corners of the cabinet. The information center includes at least two of (a) a thermometer display indicating the temperature inside of the cabinet; (b) a display indicating time information from a programmable timer; and (c) an information board for displaying text. The releasably locking swivel casters are unlocked to allow swivel action of the casters when a user actuates a foot-operable lever at the front of the cabinet, and are locked when the user releases the lever and the casters are rotated to a predetermined position.

9 Claims, 12 Drawing Sheets

HEATED BANQUET CART

RELATED APPLICATION

This application is a divisional of application Ser. No. 10/915,387, filed Aug. 11, 2004, the entire contents of which are incorporated herein by reference.

BACKGROUND OF THE INVENTION

1. Field of the Invention

The present invention is directed to improvements in heated banquet carts that overcome many of the problems of conventional carts. Specifically, the present invention is directed to a cart that is more maneuverable, provides better and more efficient interior heat circulation, and provides improved operating information to the user.

Generally speaking, the present invention will be referred to as a "cart," which is maneuverable and which incorporates an enclosed "cabinet" for storing heated items such as food.

2. Description of the Related Art

Conventional banquet carts are known in the art. Such banquet carts are commonly used for storing and transporting prepared foods. An example of such a cart is shown in U.S. Pat. No. 4,108,518 (Angst). In addition, conventional carts are available from such companies as InterMetro Industries Corporation (www.intermetro.com), which is related to the assignee of the present invention, Carter-Hoffman (www.carter-hoffman.com), and Food Warming Equipment, Inc. (www.fweco.com).

Typically, such banquet carts have a generally rectangular horizontal cross-sectional shape or footprint. The cabinet incorporated with the cart has one or more doors that open to reveal shelves or the like for supporting plates, food service trays and similar food service items. This structure allows a user to store inside of the cabinet prepared meals that are ready for service. The walls and doors of the cabinet are typically thermally insulated so that the cabinet will retain heat, which serves to keep the prepared foods warm before they are served.

To aid in keeping prepared foods warm, some conventional banquet cabinets also include electric heaters that can be plugged into an electrical outlet in order to maintain an elevated temperature inside the cabinet. It is also known to use chaffing fuel canisters (such as STERNO® fuel canisters) to provide heat to the interior of the cabinet when, for example, a source of electrical power is not readily available. Typically, the chaffing fuel canisters are ignited and positioned at the bottom of the cabinet in order to provide heated air to plates or service trays stored on the shelving above the canisters. High-end carts often include a combination of an electric heating unit and a supplemental heating unit designed for holding and distributing heat provided by chaffing fuel, to provide the user with multiple heating options.

In addition to merely keeping food warm, conventional banquet carts also allow for transporting of the stored food. A typical cart is configured such that its base is supported on wheels or casters, allowing the cart to be moved from food preparation areas, to "staging" areas where food is held before ultimate service. From the staging areas, the plates or service trays can be removed from the heated cabinet and delivered to dining guests in a banquet hall, for instance.

While these conventional banquet carts are adequate for their intended purpose, they are characterized by certain drawbacks yet unsolved in the art. In particular, when chaffing fuel canisters are used, it is difficult to circulate the heated air that they provide evenly throughout the cart. Also, because many carts may be used when serving a large group of people, it can become difficult to keep track of which food items are stored in the various carts, and the length of time during which those food items have been stored. In addition, when multiple carts are aligned side-by-side, the maneuverability of one cart positioned between other carts can be difficult with the conventional arrangement of wheels or casters at the base of the carts. These problems will be discussed in more detail below.

Problems Related to the Use of Chaffing Fuels

As noted, when electric heating units cannot be used conveniently, users often just place chaffing fuel canisters in the bottom of the banquet carts. In such situations, the plates or trays positioned on shelves directly above the burning chaffing fuel often become too hot too quickly. Also, in the absence of a fan or suitable heat transfer mechanism for circulating the heated air, the plates on shelves at the top of the cabinet often cool too rapidly.

To compensate for this disparity in heat distribution, some manufacturers offer specialized systems for handling chaffing fuels. The specialized systems may include heat shields which protect items stored on lower level shelves from overheating, and chimneys for distributing heat provided by the chaffing fuel more evenly throughout the cabinet.

Conventionally, such chimneys are provided along the back or side walls of the cabinet. Also, the chimneys usually have rectangular cross-sectional shapes. While this may provide for adequate circulation of heated air in some instances, the configuration and placement of such chimneys often leads to either a reduction in the holding capacity of the cart, or an increase in the size of the footprint of the cart, to compensate for the space occupied by the chimneys. Accordingly, there is a need for a cabinet that is easy to manufacture, and in which chaffing fuels can be effectively used without the loss of valuable interior storage space or the unnecessary expansion of the exterior size of the cart.

Problems Related to Maneuverability

Logistics often require the use, movement, and positioning of multiple carts.

Commonly, banquet carts are moved both along straight lines and through curves to their final destinations. In these conditions, the carts are easily moved where two casters on a trailing or rear end (in the direction of cart movement) are free to swivel and two wheels on a second or leading end are fixedly secured so as not to swivel and to be aligned so that their planes of rotation are substantially parallel with the direction of movement, when the cart is pushed or pulled in a straight line. This common configuration, much like the reverse of the configuration of a common shopping cart, allows for maneuvering the cabinet along straight lines and through turns. However, banquet carts are sometimes positioned end-to-end along a wall or the like in the staging area. The above-discussed arrangement of casters and wheels makes it difficult to move an individual banquet cart sideways in to or out of a row of carts. In such cases, it is possible to have all of the wheels comprise swivel casters, to provide easy movement in a sideways direction (that is, perpendicular to the end-to-end row in which the cart is positioned). However, with four swivel casters, maneuvering the cart in a straight line over long distances and through curves becomes difficult for a user.

Accordingly, there is a need in the art to provide a more maneuverable banquet cart to overcome the problems of conventional carts.

While not relating to heated banquet carts, each of U.S. Pat. Nos. 4,875,696 (Welch, et al.) and 4,790,610 (Welch, et al.) disclose mechanisms for locking casters supporting a cart in particular orientations. However, as will be explained further below, those mechanisms are not entirely suitable in the present application.

Problems Related to Information Management

It is also useful to a user to be able to ascertain quickly information such as the contents of the banquet cart, how long food has been stored in the banquet cart, when chaffing fuel canisters will likely need to be replaced, and the temperature of the inside of the banquet cart, among other data. These needs are exacerbated by the fact that service of food involving banquet carts can be fast paced, with the meals needing to be served without having become too cold or having become over cooked or dried out from prolonged heat exposure.

Conventional banquet carts do not provide much of this desirable information to the user. While many conventional carts include temperature gages, such a feature alone is not always helpful to a user. For instance, although a user can readily ascertain the temperature of the inside of the banquet cart by referring to a gage, he or she cannot determine how long the food has been stored at that temperature.

Also, while some conventional banquet carts offer windows for viewing the contents, they do not provide a reliable way to determine the state of the whole of the cart contents. Specifically, plates of food are often stacked many deep in the cart, such that a window alone will not allow a user to determine what is in the back of the cart. In addition, the plates may be covered during storage in the cart, rendering windows useless. Still further, windows add to the manufacturing cost and can lead to increased heat loss.

Thus, there is a need to provide users with readily accessible information that can aid in the monitoring and managing of banquet carts and the food stored in them.

SUMMARY OF THE INVENTION

In one embodiment, the present invention is directed to a banquet cart incorporating a cabinet having a plurality of chimneys on its interior. The cabinet is for storing food items and has a substantially rectangular horizontal cross-section or footprint. Each of the plurality of chimneys is positioned inside the cabinet at a different corner of the cabinet, as defined by the substantially rectangular footprint. Also, each chimney extends from a chimney entrance, which receives heated air ducted to the chimney from a heat source when a heat source is provided in the cabinet.

In another embodiment, the present invention is directed to a banquet cart having at least two swivel casters, a locking mechanism for locking at least one of the casters, and a lever or actuator for actuating the locking mechanism. The swivel casters are secured to the bottom of and support the cart. The casters also swivel about substantially vertical axes. The locking mechanism engages at least one of the casters to prevent swivelling movement thereof, when in a locked position. The lever releases the locking mechanism from the locked position when actuated, so as to allow such swiveling movement of the caster. When the lever is released, the locking mechanism (i) is biased toward the locked position, and (ii) engages the locking swivel caster, so as to prevent swiveling movement thereof, when the locking swivel caster is rotated about its axis to a predetermined position. The actuator for the locking mechanism is accessible at the front or back of the cart and may conveniently be operated by a user's foot.

In yet another embodiment, the present invention is directed to a banquet cart including a pair of leading end swivel casters, a pair of trailing end (in the direction of cart movement) swivel casters and a locking mechanism. Each of the pair of leading end swivel casters has a rotatable wheel and the swiveling movement of the caster is releasably lockable in a predetermined position. The locking mechanism locks the leading end swivel casters against swiveling movement in the predetermined positions, when the locking mechanism is in a locked position. The planes of rotation of the wheels of the leading end swivel casters are substantially parallel when the leading end swivel casters are locked in their predetermined positions. Again, the locking mechanism is accessible for operation at the front or back of the cart by a user's foot.

In another embodiment, the present invention is directed to a banquet cabinet for storing food items and incorporating an information center. The information center is provided on the outside of the cabinet. Also, the information center includes at least two of (i) a thermometer display indicating the temperature inside the cabinet; (ii) a display indicating time information from a programmable timer; and (iii) an information board for displaying text.

DETAILED DESCRIPTION OF THE INVENTION

Initially, the principal features of the present invention will be described generally in order to provide an overview of its various aspects. Then those features will be described in detail.

Figure 1:
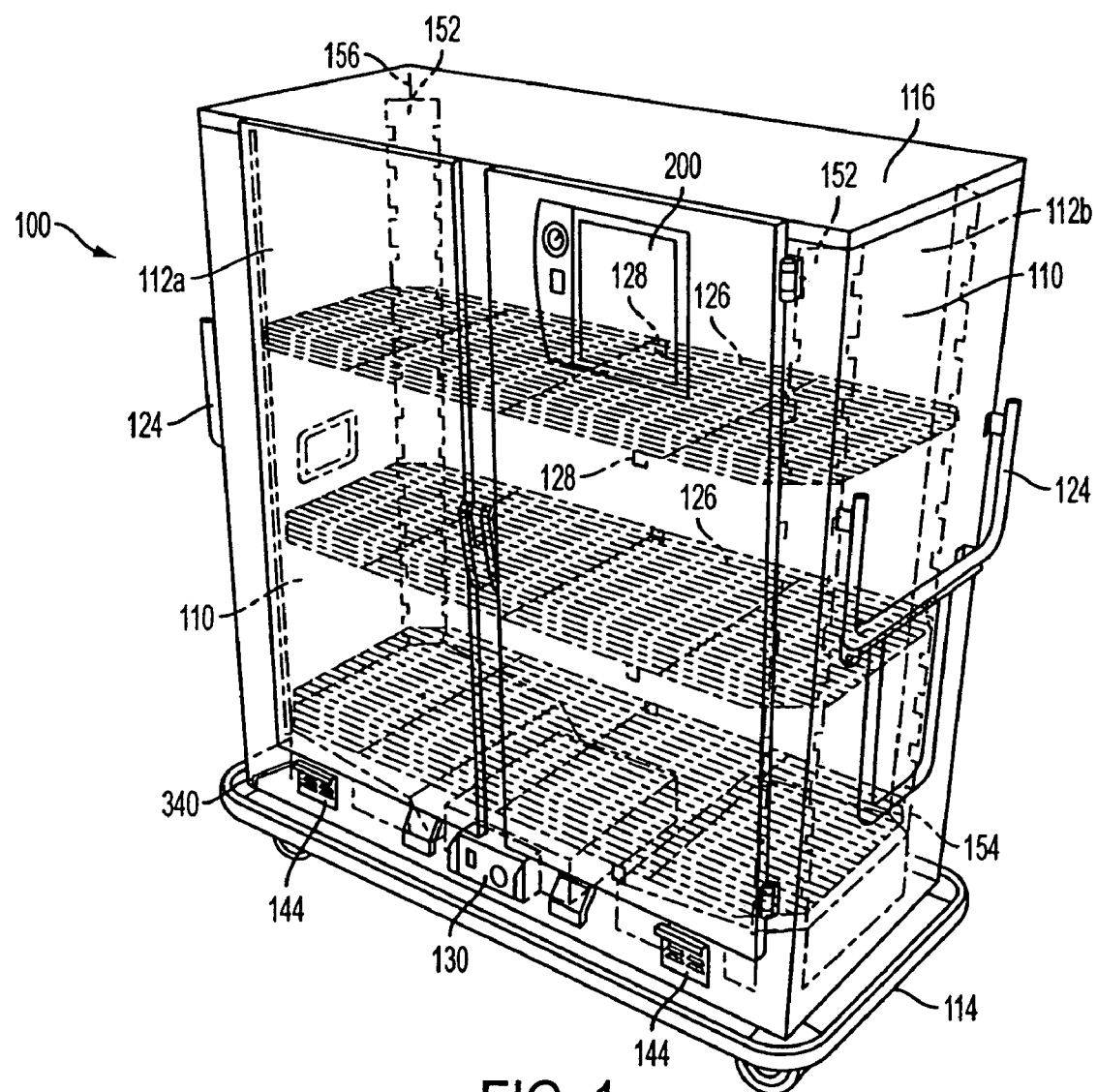
FIG. 1 is a perspective view, partially in phantom, of a banquet cart according to the present invention.
Figure 2:
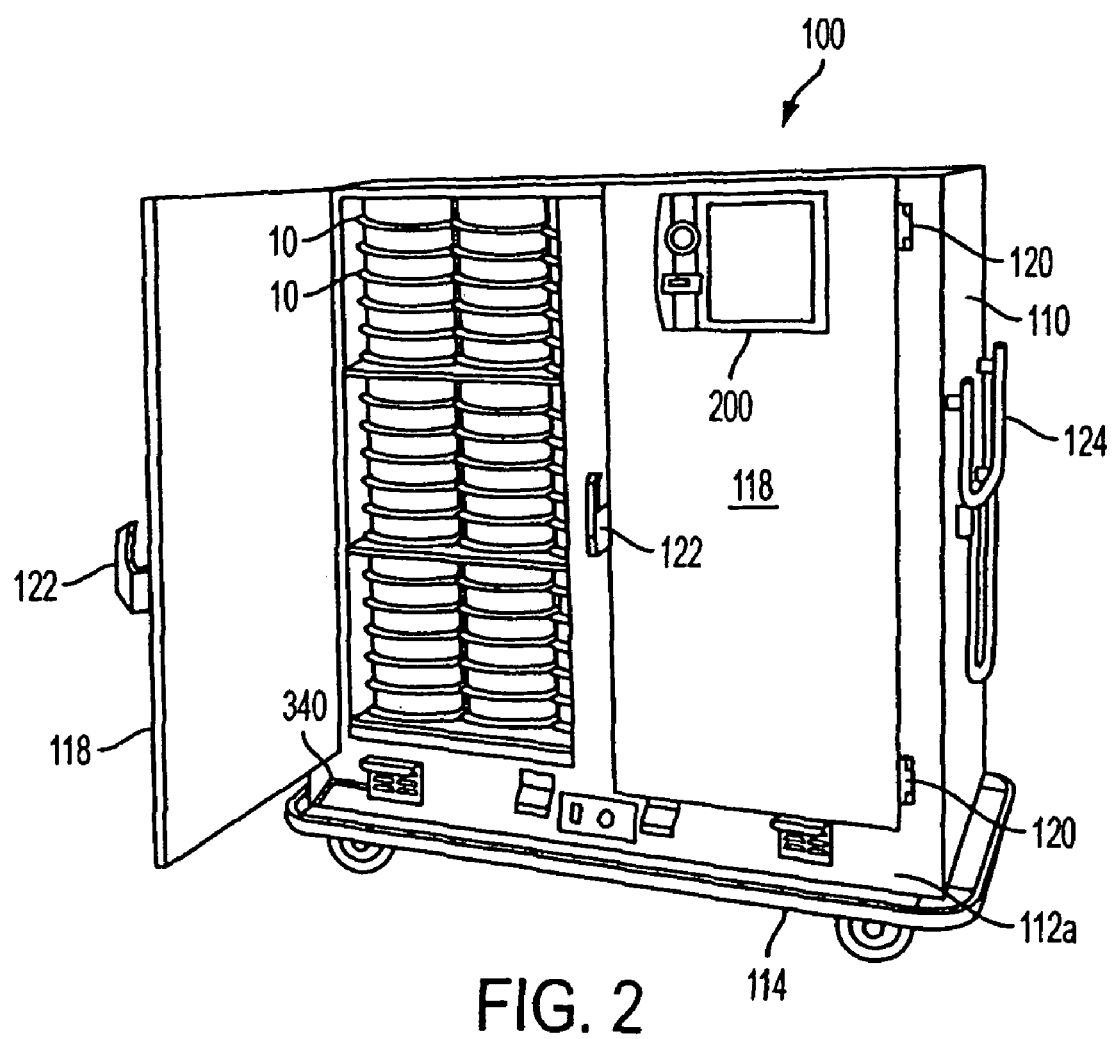
FIG. 2 is another perspective view of the banquet cart shown in FIG. 1.

FIGS. 1 and 2 show one embodiment of a banquet cart according to the present invention. As shown in those figures, the banquet cart 100 has a substantially rectangular horizontal cross-section or foot print as defined by base 114. The base 114 supports long walls 112a and 112b, wall 112a being the front wall, and wall 112b being the back wall. The base 114 also supports short side walls 110. Side walls 110 and walls 112a and 112b support a top 116. Top 116, base 114, and the walls 110 and 112 generally define the enclosure of banquet cart 100 which is referred to as the cabinet. The walls 110 and 112 and top 116 are preferably made of stainless steel or aluminum and are thermally insulated with known materials in a well-known manner.

Two oppositely opening doors 118 are mounted with door hinges 120 on the front wall 112a to enclose openings in it. Doors 118 are secured in a closed position by door handles and latches 122 in known fashion. While two doors are shown and described with respect to the preferred embodiment, one or more doors may be provided. Also, handles 124 are provided on both side walls 110 to aid a user in maneuvering banquet cart 100.

Doors 118 open to allow access to the inside of cabinet to store items such as plates 10 holding individual meals, and food service trays (not shown), holding food to be served to diners. In a preferred embodiment, one of the doors includes an information center 200, which will be described in more detail below.

The plates or trays are preferably supported by shelves 126, which are, in turn, supported by brackets 128 within the cabinet. Any number of different types of shelving systems may be used while keeping within the scope of the present invention. Further, the mounting systems may also be varied, as would be readily understood by those of ordinary skill in the art.

Figure 3:
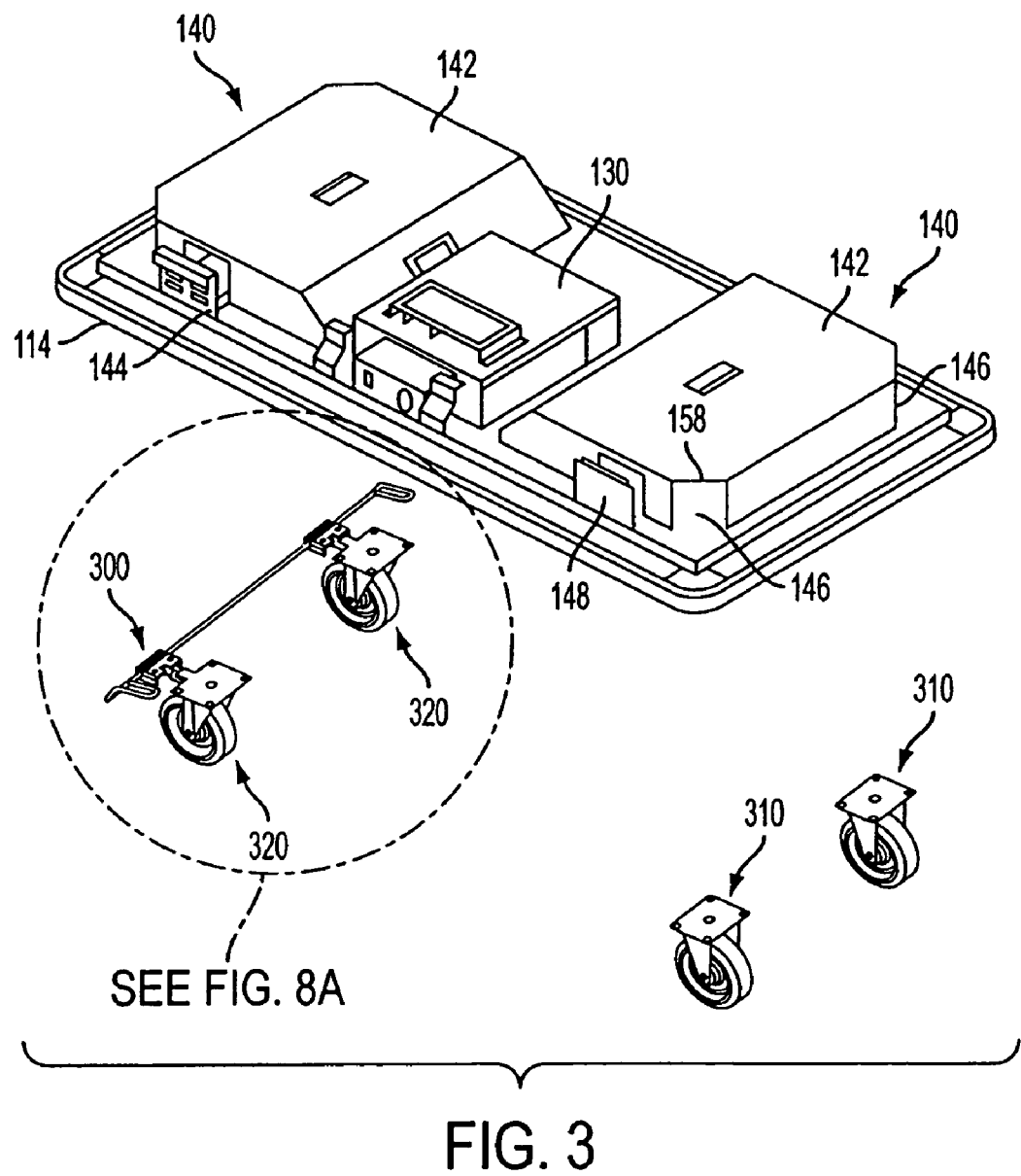
FIG. 3 is a partially exploded view of the base of the banquet cart shown in FIG. 1.

In this embodiment, inside the banquet cart 100, supported on base 114, there is provided an electric heating unit 130 and two auxiliary heating units 140, as can be seen in FIG. 3. Electric heating unit 130 includes an electric heater that generates heated air to keep the contents of banquet cart 100 warm during storage. Such an electric heating unit 130 is supplied with an electrical power cable (not shown) that plugs into a conventional electrical outlet. Preferably, the electric heating unit 130 also includes an electric fan (not shown) which is used to circulate the heated air throughout the inside of banquet cart 100. The configuration of such electric heating units is well known, and any one of a number of different types may be used in association with the present invention.

Auxiliary heating units 140, mounted to the left and right of the electrical heating unit 130, are substantially mirror images of each other, and thus only one will be described. Auxiliary heating units 140 are used for generating heated air provided by ignited chaffing fuel contained in a chaffing fuel canister. It should be understood that auxiliary heating units 140 may be modular such that they can be provided with a completed banquet cart 100, or easily added later by a user. In this manner, a user may purchase a simple banquet cart with only an electric heating unit, and may later retrofit the cart with one or more auxiliary heating units, or vice versa, without needing to buy an entire new cart.

As shown in FIG. 3, each auxiliary heating unit 140 includes a heat shield 142, drawer 144 and outer corner vents 146. A drawer 144 in each unit 140 is accessible through the front wall 112a of the cabinet, and is configured to receive and hold a chaffing fuel canister. (When chaffing fuel is not to be used, drawer 144 may be replaced by a cover 148.) A user may ignite the chaffing fuel and then close drawer 144. When drawer 144 is closed, the ignited chaffing fuel canister is automatically positioned under heat shield 142.

Heat shield 142 shields items stored on lower shelves 126 in the banquet cart 100 from excessive heat. Heat shield 142 is preferably made from materials such as stainless steel. Further, heat shield 142 may be sloped upwardly toward the side walls 110 of the cart so as to channel or direct heated air to one or more of the vents 146.

Each vent 146 is an opening generally facing a corner of the banquet cart 100 defined by the intersection of one wall 112 and one wall 110. Each auxiliary heating unit 140 includes, preferably, two vents 146, one for each associated corner. Preferably a vent 146 is an opening in the auxiliary heat unit. In more preferred embodiments, the opening is substantially perpendicular to base 114. Extending upwardly from each vent 146 is an elongated plate 152, which forms a portion of chimney 152a, as shown in FIGS. 1 and 7A to 7C. Preferably plate 152 extends up from a corner edge 158 of the heat shield 142 so that it is substantially perpendicular to base 114 and substantially coplanar with vent 146. The details of chimney 152 will be discussed in more detailed below.

As shown in FIGS. 2 and 3, base 114 is itself supported by casters 310 and 320, or other similar wheel or rolling mechanisms. ("Wheels" are generally understood in the art to be mounted for rotation in a fixed plane about a fixed axis while "casters" are generally understood to rotate about a horizontal axis that may swivel about a vertical axis. As used herein, however, "casters" may be understood as any rolling mechanism such as wheels or the like that imparts mobility to the cart.) In this embodiment, casters 310 are arranged near one of the side walls 110 (also on an opposite face of base 114), and casters 320 are arranged near the other side wall 110 (on an opposite face of base 114). While four casters are shown (see FIG. 3), this is only a preferred embodiment, and other numbers and arrangements of casters or other wheel or rolling mechanisms may be used. Also, it is preferable that all of the casters 310 and 320 be capable of swiveling movement about a typically vertical axis such that the rolling mechanism rotates so as to allow the direction of alignment or vertical plane of rotation of the caster to be alterable to change the direction of movement of the cart. Such casters are readily available commercially. Of course, other caster or wheel suppliers may also be able to provide suitable mechanisms for making cart 100 mobile. However, in accordance with the present invention, the casters 320 are also provided with a releasable, lockable mechanism, so as to be locked against such swiveling movement when a user so desires. The locking mechanism is operable by a user with his or her foot at the front wall 112a or back wall 112b of the cart. This feature will be discussed in more detail below.

Each of the principal features of the present invention will now be described in detail.

Heat Circulating Chimneys

Figure 7A:
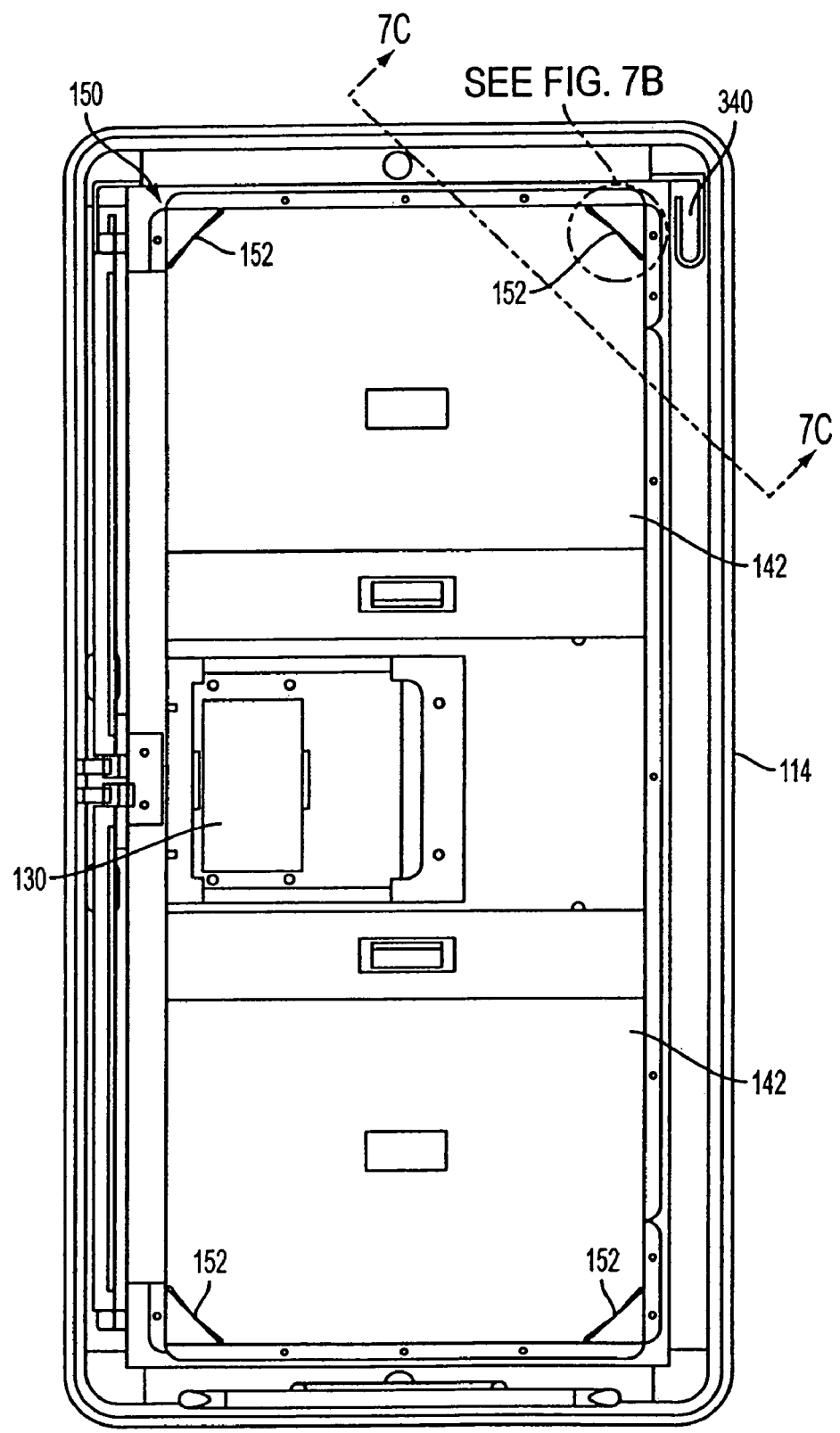
FIG. 7A is a top view of the banquet cart shown in FIG. 1 with the top removed to show interior detail.
Figure 7B:
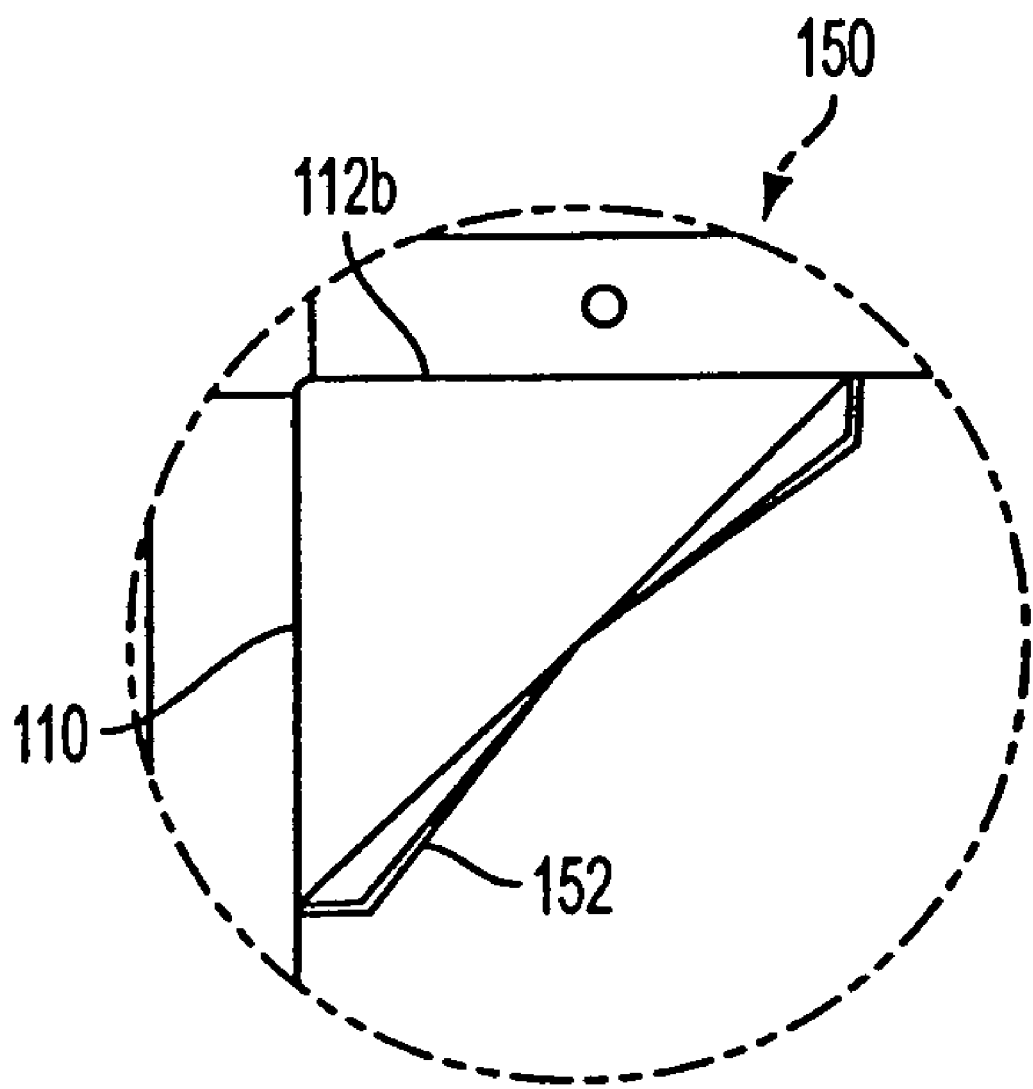
FIG. 7B is an enlarged view of a portion of the cart shown in FIG. 7A.
Figure 7C:
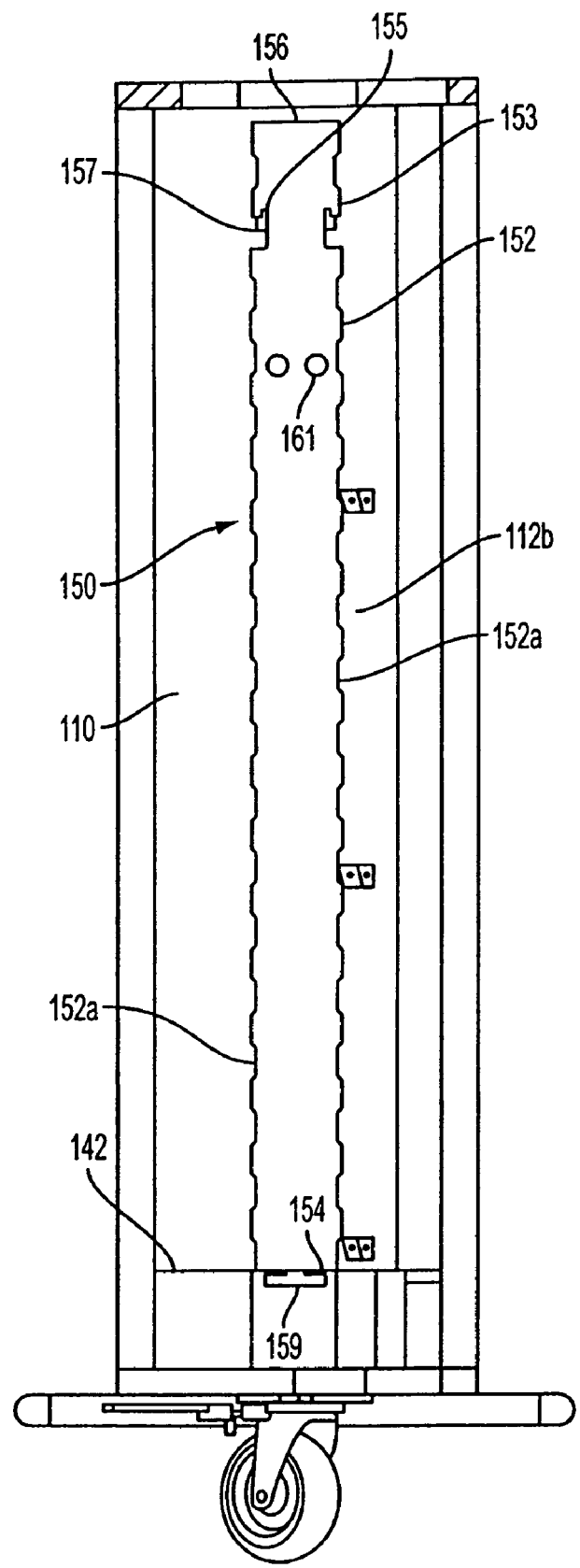
FIG. 7C is a vertical cross-sectional view taken along plane 7A-7C in FIG. 7A.

Chimneys 150 are located at the corners of banquet cart 100. Specifically, as shown in FIGS. 7A to 7C, chimneys 150 are provided at the corners defined by the intersections of walls 110 and 112. With the placement of the chimneys 150 in the corners, it is possible to reduce the useful internal space occupied by such chimneys thereby increasing the space available for stored items. More specifically, because plates are most commonly stored in banquet carts, the loss of corner space impacts the useful space of the cart minimally, if at all, since circularly-shaped plates do not completely nest in the corners of the inside of a cart when those corners form right angles. Also, preferably, chimneys 150 are substantially triangular in their horizontal cross-sectional shape. Triangular chimneys 150 even further add to the benefit of the invention by enhancing the chimney space, without significantly interfering with the storage of round plates, for instance. When triangular in shape, such free standing structures may be positioned such that an apex of the triangle nests in such corners defined by walls 110 and 112.

Chimneys 150 can be free standing structures positioned in the corners of the inside of the banquet 100. In the present embodiment, instead of being free standing, chimneys 150 are each defined by an elongated plate 152, which is substantially rectangular in shape, and walls 110 and 112. Specifically, plate 152 is mounted within banquet cart 100 such that the long sides thereof straddle walls 110 and 112, with one long side of plate 152 being adjacent one wall 110, and the other long side of plate 152 being adjacent the adjoining side wall 112 (see FIG. 7B). Plate 152 may be mounted relative to these walls in this way with any one of a number of conventional mounting means. In the preferred embodiment the plate is formed with depending ears 153 near its top that form downwardly open notches 155. These notches engage a hanger bracket 157, having complementary notches, that is secured in an upper region of a corner formed by adjoining walls of the cart. The bottom of the plate 152 is formed with a tab 159 in the form of an inverted T shape that grasps the top wall of the heat shield where vent 146 is defined (see FIG. 7C). When so in place, the T shape tab engagement with the heat shield effectively prevents the chimney from moving upwardly and locks it in position. The plate is dimensioned to be spaced a small distance from the top of the cart so that it can be dropped down with the ears 153 engaging the bracket and the tab 159 engaging the heat shield at the vent. Conversely, the plate may be lifted vertically to remove it from such engagements. Finger holes 161 are provided to assist in this manipulation.

Thus mounted, plate 152 and the portions of corresponding wall 110 and wall 112 positioned between the plate 152 and the corner substantially define chimney 150. Plate 152 is preferably made of stainless steel, so that heat may be transferred therethrough at least in some part by conduction into cart 100 along the length thereof. The insulating properties of walls 110 and 112 help to direct and deflect the conduction of such heat through plate 152 toward the food items stored in cart 100.

Further, as can be seen in FIG. 7C, the vertical edges of each plate 152 are also formed with a series of notches 152a that provide outlets next to the respective adjacent walls 110 and 112 so that heated air traveling upwardly through a chimney may pass into the interior of the cabinet at various vertical levels by convection. The shape, size and spacing of the notches 152a may be selected or progressively varied so as to balance the distribution of heated air inside the cabinet. Alternatively, holes may be provided in the face of the plate to permit heated air to enter the interior of the cabinet.

Plate 152 is mounted on walls 110 and 112 such that a bottom, short side is positioned above base 114 and substantially mates with the top of vent 146 defined by heat shield 142 of auxiliary heating unit 140 (that is at each corner edge 158). Thus, an entrance 154 is provided in the bottom of each chimney 150 so as to be in fluid communication with the vent 146 of auxiliary heating unit 140. Thus configured, when a chaffing fuel canister is ignited and positioned in drawer 144, heated air from the auxiliary heating unit 140 is ducted to one or more chimneys 150 connected thereto. The heated air is transmitted by convection up through chimneys 150 and through plate 152 to heat the inside of banquet cart 100.

The top of chimney 150 also includes an exit 156 (see FIG. 1). Exit 156 is formed by plate 152 being secured so as to be spaced from the top 116 of banquet cart 100. This structure allows some of the heated air passing through chimney 150 to escape through the top of the chimney into cart 100. Thus, chimney 150 does not direct heated air out of cart 100, but merely helps circulate it through cart 100. Of course, this is only one preferred embodiment, and variations thereof are possible while keeping within the scope of the present invention.

The width of plate 152 is preferably in the range of about 3.75 to 4.25 inches. With such a width, particularly when walls 110 and 112 form a right angle at their intersection, plate 152 can define a chimney having a preferred cross-sectional area for conducting heated air. Further, in preferred embodiments, plate 152 is mounted so as to be spaced from the top 116 by approximately 0.25 to 0.50 inch.

It is also possible to construct each chimney as a separate modular three-walled structure rather than forming each chimney with the plate 152 and adjacent portions of the walls 110 and 112. Such modular structures can be installed in the cabinet when the auxiliary heating units are installed.

Locking Swivel Caster System

As discussed above, base 114 is supported by casters 310 and casters 320.

Figure 4:
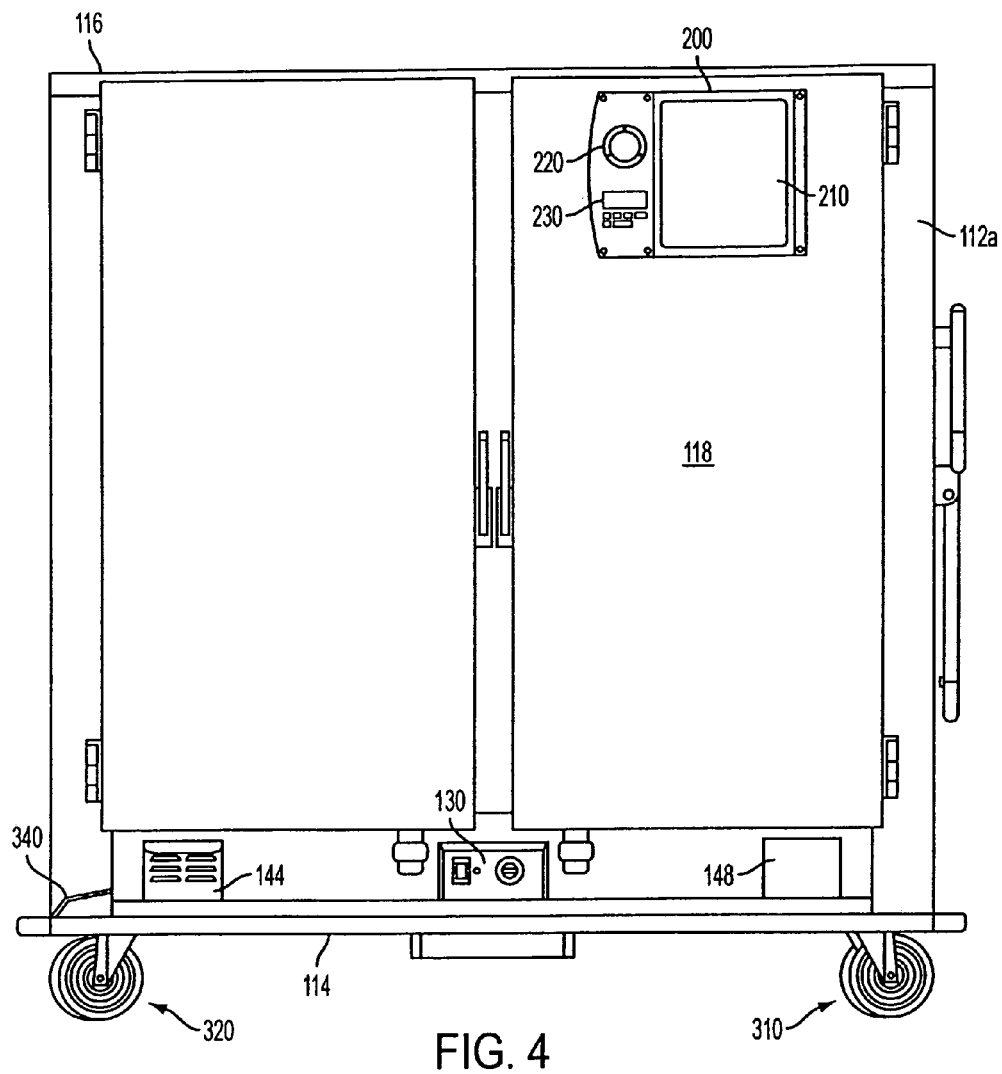
FIG. 4 is a front view of the banquet cart shown in FIG. 1.

As shown in FIGS. 3 and 4, casters 310 are preferably aligned under base 114 along or near a side wall 110. In addition, casters 310 preferably swivel 360° around an axis substantially perpendicular to base 114 in a conventional way.

Casters 320 are preferably mounted under base 114 so as to be near a position under the opposing wall 110. However, casters 320 may be slightly offset from each other such that one of casters 320 is closer to one short side of the cart 100 (a wall 110), and another caster 320 is closer to the other side (opposing wall 110). This offset feature permits the casters to cross a threshold alternately in stepwise fashion rather than confronting the threshold at the same time, thereby to ease movement of the cart over the threshold. At least one and preferably both of the casters 320 are swivel casters that are releasably lockable in a fixed plane. When unlocked, casters 320 may swivel freely in the same manner as casters 310. When locked, casters 320 are inhibited from swiveling. When locked, casters 320 are aligned such that their wheels 322 (that is, the planes of rotation of the wheels) are substantially parallel to each other and substantially perpendicular to walls 110 and substantially parallel to walls 112. Thus, when locked, wheels 322 of casters 320 are aligned to allow for easy movement in a direction substantially perpendicular to walls 110. Further, with casters 320 in their locked positions and casters 310 able to swivel freely, the cart can also be easily maneuvered in a straight path and through turns.

More particularly, as shown in FIGS. 8A, 8B, 9A and 9B, casters 320 each include a wheel 322, a horn 326 including opposing depending legs 327, a swivel mount 328, a plate 324, and a notch 330 in the swivel mount 328. Wheel 322 is rotatably mounted about an axis that spans the space between the depending legs 327 of a horn 326, which is in turn secured to swivel mount 328. Swivel mount 328 is rotatably secured to plate 324 to provide the swivel action through, for example, ball bearings (not shown). The notch 330 is formed in the swivel mount 328 and interacts with a locking mechanism 300 as described below.

Locking mechanisms 300 are substantially the same for each caster 320. Each locking mechanism 300 engages notch 330 to inhibit rotational movement of swivel mount 328, and includes a lever 340, an actuating rod 342, an L-shaped rod 344, a connection plate 346, a cylinder 350, a detent 354 and a detent connector 352.

Figure 8A:
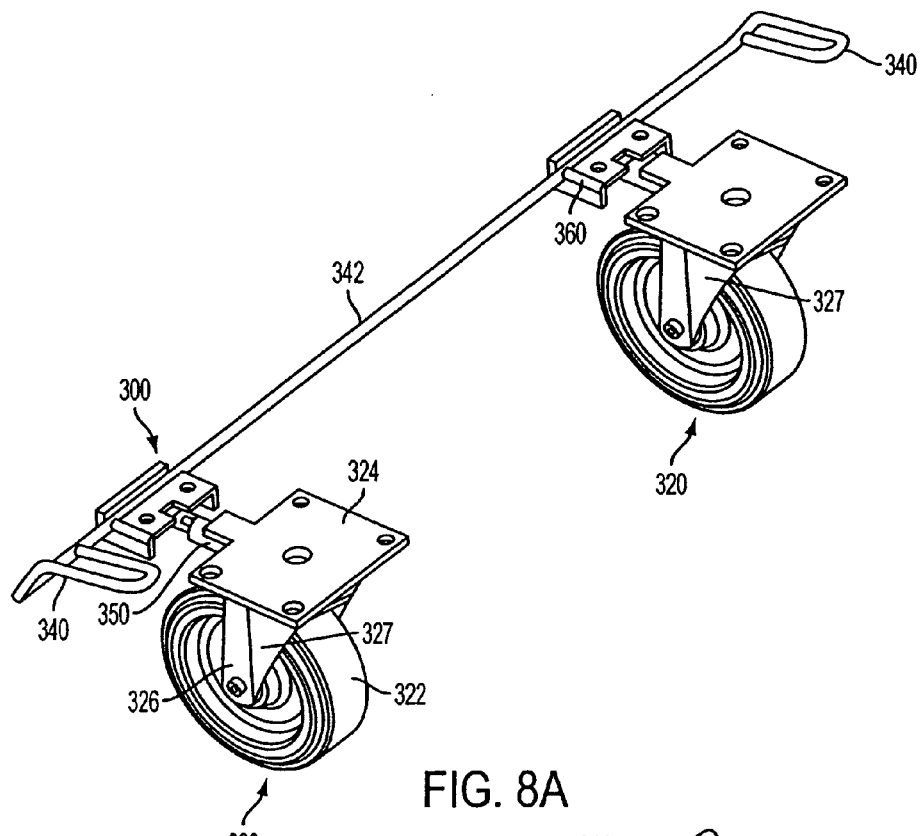
FIG. 8A is a top perspective view of the casters and locking mechanism for the banquet cart according to one embodiment of the present invention.
Figure 8B:
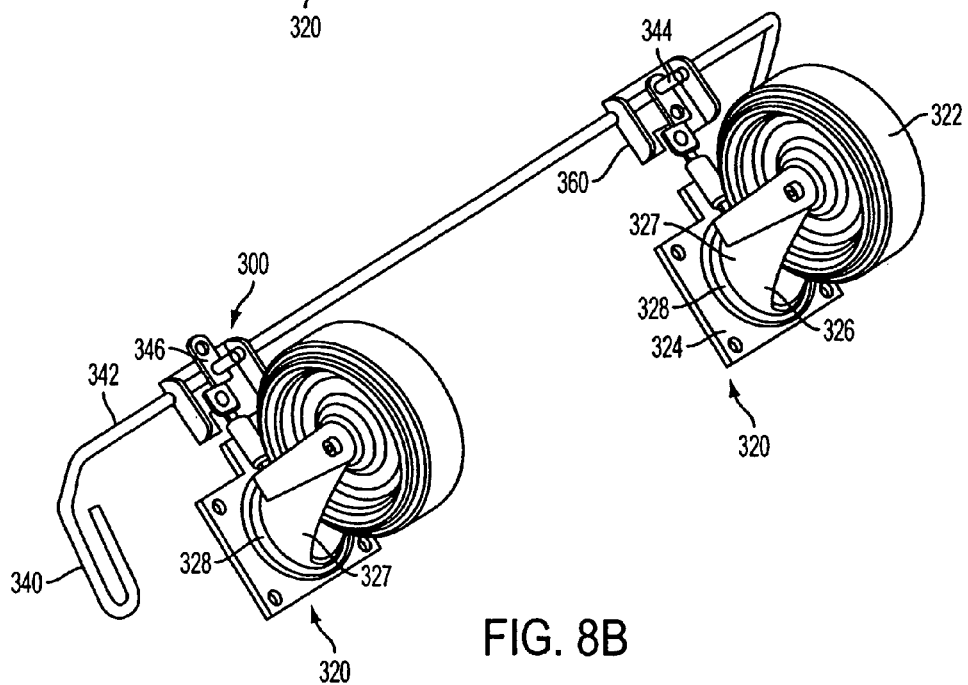
FIG. 8B is a bottom perspective view of the casters and locking mechanism according to that embodiment of the present invention.

Lever 340 is formed with the actuating rod 342. Actuating rod 342 is mounted for rotation about its axis on the bottom of base 114 by brackets 360. Attached to actuating rod 342 is the L-shaped rod 344 which is connected to actuating rod 342 along one length of the L shape. The other length of the L shape of the rod 344 extends through hole 346a of plate 346. (The locking mechanism 300 associated with the other caster 320 is slightly different in that L-shaped rod 344 engages hole 346b of plate 346, in order to account for the offset of the two casters 320 as seen in FIG. 8A.) Connector plate 346 is secured to detent connector 352. Detent connector 352 extends into the base of cylinder 350. Mounted in cylinder 350 is the detent 354, which is biased within cylinder 350 by a spring (not shown) inwardly toward the swivel mount 328. Within cylinder 350, detent connector 352 is secured to detent 354. In particular, the spring loading of detent 354 is configured such that it is biased out of cylinder 350 in a direction opposite to its point of attachment to detent connector 352, away from actuating rod 342. At an end of cylinder 350 opposite to an end through which detent connector 352 extends, detent 354 protrudes from cylinder 350.

Figure 9A:
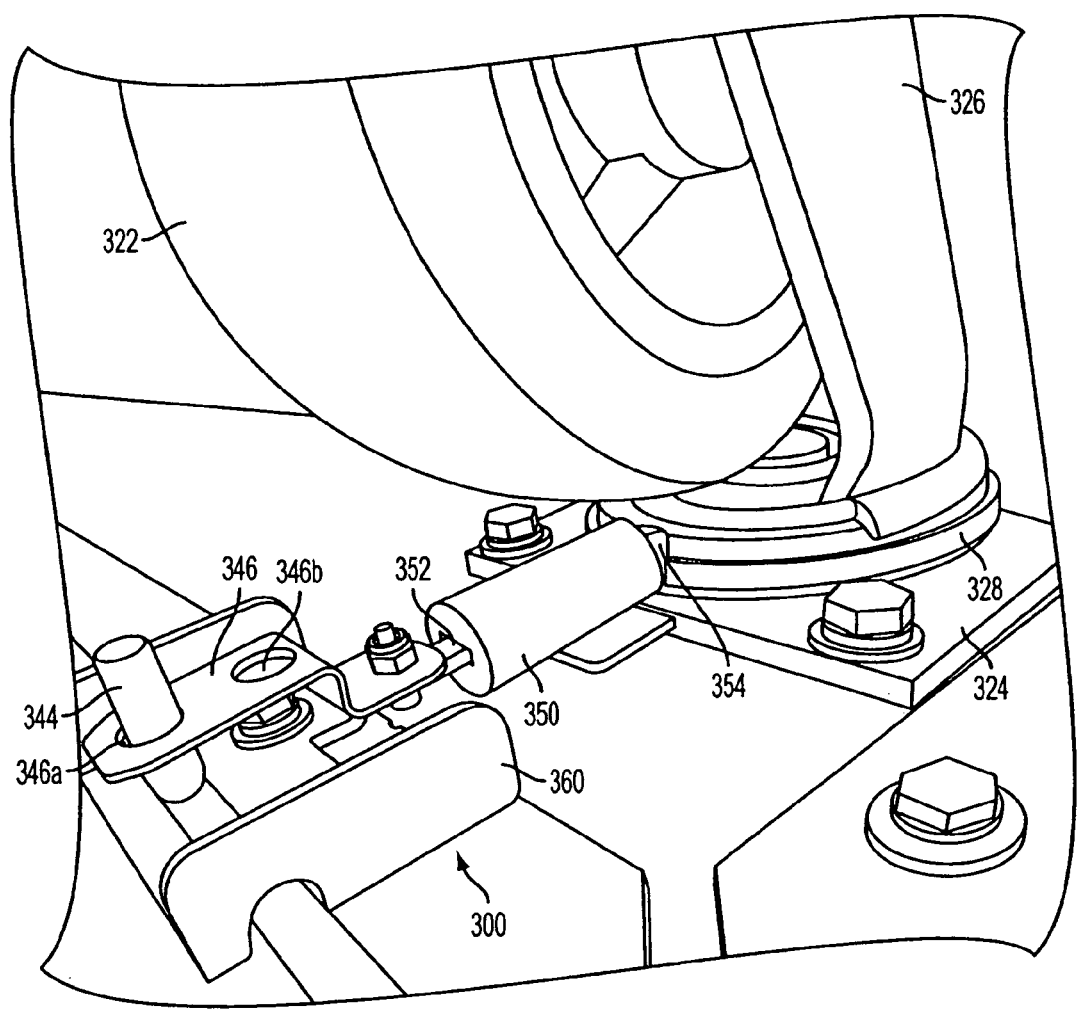
FIG. 9A is an enlarged perspective view of a portion of the locking mechanism shown in FIGS. 8A and 8B, showing a caster in a locked position.
Figure 9B:
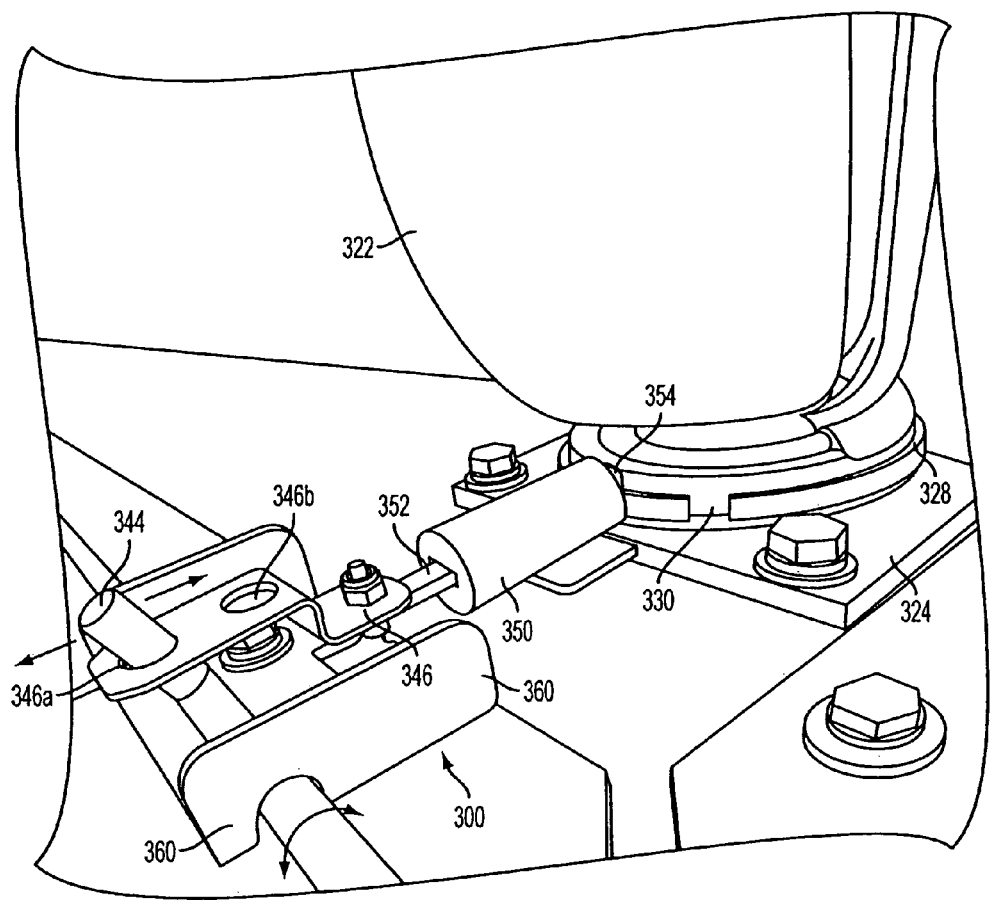
FIG. 9B is another perspective view of a portion of the locking mechanism shown in FIGS. 8A and 8B, showing the caster in an unlocked position.

Spring loaded detent 354 is biased by the spring toward swivel mount 328, and thus automatically engages the notch 330 when the two are aligned. When engaged with notch 330, as shown in FIG. 9A, detent 354 inhibits the rotation of swivel mount 328, fixing wheel 322 in the predetermined position.

As shown in FIGS. 1 and 3, while actuating rod 342 is mounted on the bottom of base 114, lever 340 extends through an opening in base 114 so as to protrude above base 114. As shown in this preferred embodiment, lever 340 is positioned on a side of banquet cart 100 in front of, and along, front wall 112a. The other lever 340 is positioned at a corresponding position along back wall 112b. While lever 340 may be positioned in any one of a number of positions, it is preferable that lever 340 be accessible by a user on a side of the banquet cart 100 which is parallel to the plane of rotation of casters 320 when locked in the predetermined positions (that is, on a side of the cart which is substantially parallel to a direction in which the cart 100 can be moved in a straight line when the casters 320 are in their locked positions). Accordingly, it is preferred that the plane of rotation of wheels 322 of casters 320 be substantially parallel to each other when locked in the predetermined positions.

Thus configured, when multiple carts 100 are aligned end-to-end in a staging area, for example, a user can easily maneuver a middle one of the banquet carts 100 from its position through sideward movement. This function is achieved, for example, by the user depressing lever 340, at the front or back of the cart, with his or her foot. This placement of the actuator lever makes it accessible even when many carts are tightly aligned in a row end to end. Accordingly, the depression of lever 340, which is positioned so as to be easily actuated by a user's foot, rotates actuating rod 342. The rotation of actuating rod 342 causes L-shaped rod 344 to engage hole 346a and move plate 346 in a direction away from casters 320. In turn, the movement of plate 346 causes detent connector 352 to be drawn through cylinder 350, pulling detent 352 out of the notch 330, against the biasing force of the spring.

Once detent 354 is removed from slot 330, swivel mount 328 is free to swivel on wheel base 324. Accordingly, casters 320 can swivel freely, allowing a user to move banquet cart 100 sidewardly, in a direction substantially perpendicular to walls 112. This movement is achieved by pulling or pushing cart 100 in a sideward direction, which causes casters 310 and 320 to swivel so that their respective wheels align perpendicularly to walls 112.

When lever 340 is released, the spring mounted detent 354 is biased back toward swivel mount 328. If notch 330 is not aligned with detent 354, detent 354 is biased against the side of the swivel mount 328. Thus, it is preferable that the side of swivel mount 328 be smooth and circular in shape, so that, as detent 354 is biased against it, swivel mount 328 can still rotate until notch 330 is again aligned with detent 354. At this point, the biasing force causes detent 354 to re-engage the notch 330, inhibiting further rotation of swivel mount 328, locking the same in the predetermined position.

Of course, a number of other locking mechanisms can be employed to provide the releasable-lockable swivel action of the present invention. The locking mechanism shown in the accompanying drawings merely depicts a preferred embodiment thereof. One of ordinary skill in the art would appreciate the number of alternative mechanisms for embodying the invention. Further the locking mechanism may be provided for all four casters supporting the cart, if desired, or for only one of the rearwardly located casters 320.

Information Center

The improved banquet cabinet in accordance with the present invention includes an information center 200 having a plurality of integrated features which provide various information to a user. In a most preferred embodiment, information center 200 provides all of this information in one centralized location. As shown in FIGS. 2 and 4, it is preferred that information center 200 be provided on a door 118 of banquet cart 100. However, information center 200 may be provided at any one of a number of locations. In most preferred embodiments, information center 200, or a main portion thereof, is positioned on the front of banquet cart 100 at or near the typical eye level of a user when in a standing position. In alternative embodiments, information center 200 may be decentralized such that different pieces of information are provided or displayed at different locations on the cart, as desired by the designer and manufacturer.

Figure 5:
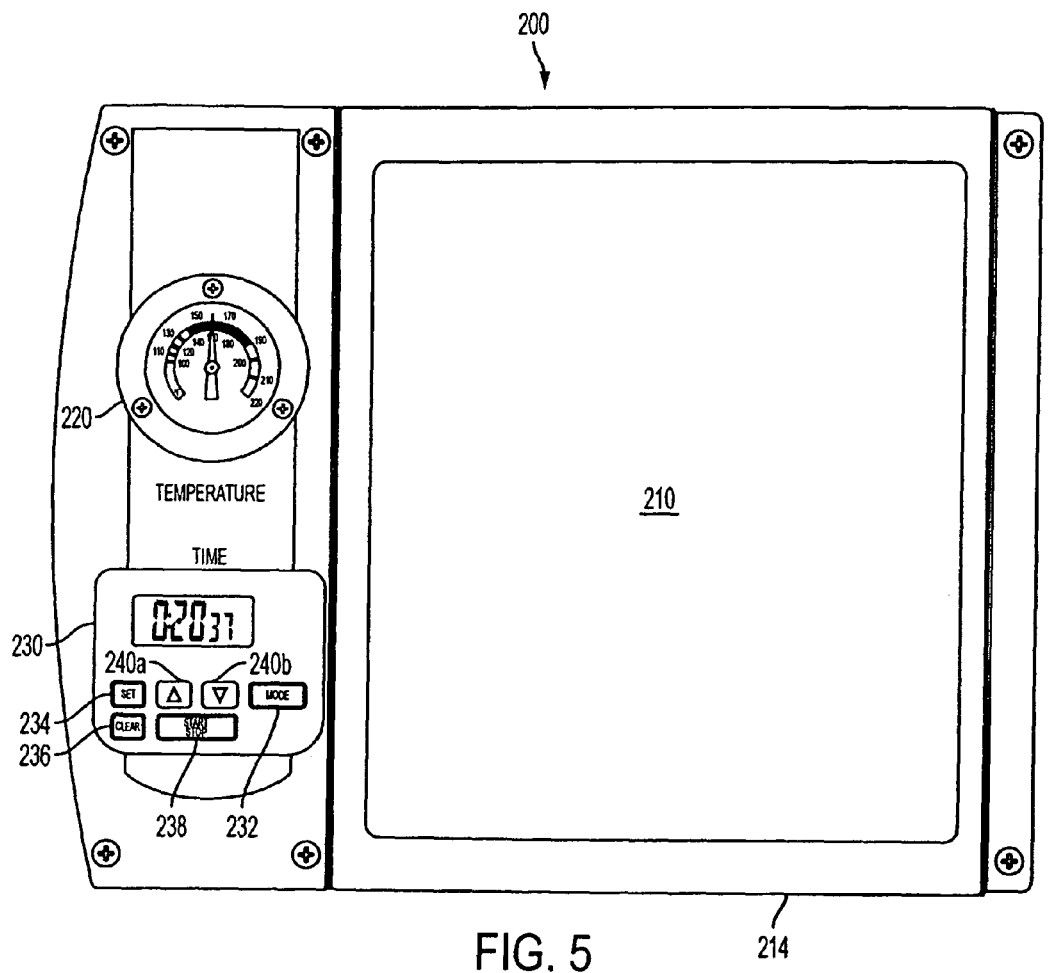
FIG. 5 is an illustration of one embodiment of an information center according to the present invention.

In the present embodiment, as shown in FIG. 5, information center 200 includes a temperature gage 220 that indicates the ambient temperature inside the banquet cabinet, where food items are stored in it. Thus, temperature gage 220 is connected to a temperature sensor (not shown) positioned so as to sense the temperature within banquet cabinet. Temperature gage 220 and the associated temperature sensor may be of any one of a number of commercially available devices. Also, the position of the temperature gage 220 and associated temperature sensor may vary depending on the design choices by the manufacturer. In addition, preferred temperature gages may include mechanical gages using dials and the like, or digital display screens, again depending on design choices. A detailed description of the operation of the temperature gage 220 and associated temperature sensor will not be provided herein inasmuch as the same would readily understood by one of ordinary skill in the art, and such types of equipment are readily available. In that regard, preferred temperature displays and sensors include a capillary bulb dial type thermometer.

Figure 6:
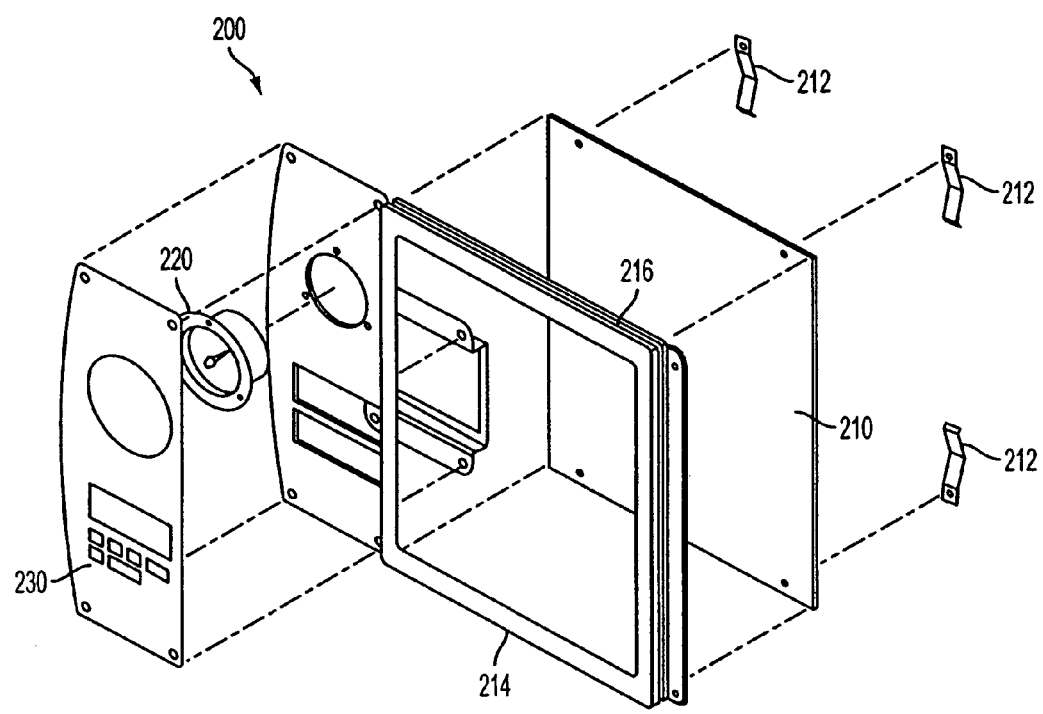
FIG. 6 is an exploded view of the information center shown in FIG. 5.

As shown in FIGS. 5 and 6, information center 200 also includes a message board 210 for displaying relevant information. More specifically, it is preferable that board 210 be used to display information concerning the contents of the banquet cart, to allow a user to ascertain that information, without resorting to opening the banquet cart and/or the covers of trays or plates contained inside. This arrangement allows for quick and efficient determination of the contents of a particular cart, and avoids the heat loss and wasted energy which occurs from opening the banquet carts doors.

Board 210 may be any information display system that allows a user to record thereon, or therein, necessary information. Preferably, board 210 is a dry-erase board on which a user may write and erase, repeatedly, information concerning the contents of the banquet cart. Most preferably, the board 210 has a conventional dry-erase surface such as epoxy, porcelain or melamine.

In addition, as shown in the embodiment depicted in FIG. 6, board 210 may be free-floating within a bezel 214. The board 210 may also be biased against an inner edge of the bezel 214 by leaf springs 212. At the top the bezel 214 may be provided with an opening 216 in which paper or another recording medium may be inserted and trapped between inner edges of the bezel 214 and board 218 by the biasing force of leaf springs 212. Thus, instead of writing on the board 210, information may be provided on a separate sheet of paper or paperboard which can easily be inserted into the information center 200 through the opening 216. Consequently, in preferred embodiments, board 220 and bezel 214 may be shaped to receive and hold an 8½×11 inch sheet of paper or paperboard.

In other embodiments, the board and the springs may be removed to allow paper to be easily inserted, and float freely, within bezel 214. In addition, other mechanisms may be provided to store information. For instance, clip boards may be used to clip information to the information center 200. Also, electronic displays may be used so that the information may be typed in and displayed on information center 200. Any one of a number of different information display systems known in the art may also be used to convey information in accordance with this invention to provide a user with text or graphical information indicating the contents of banquet cart 100, or other pertinent information or instructions related to banquet cart 100.

Information center 200 also includes a timer 230 that is operable in a number of different modes. A user may select among the different modes using mode button 232. Preferred modes include a clock mode, a timer mode, and a stop watch mode. In the clock mode, the time of day may be displayed for the user's convenience. In the timer mode, a user may count down a set time period, such as 30 minutes, causing timer 230 to count down from 30 minutes to zero, and if desired activate an aural or visual alarm. This function is particularly useful when a user wishes to keep track of when to change a chaffing fuel canister being used in the banquet cart 100. Specifically, since a chaffing fuel canister should burn for a known period of time, the user may set that time period in the timer so as to indicate when the chaffing fuel canister is expected to be exhausted.

In the stop watch mode, the timer 230 operates as a conventional stop watch, measuring elapsed time. This function allows a user to keep track of how long a banquet cart 100 has been unattended, unmoved, the duration at which the food items stored therein have been kept at the temperature indicated by the temperature gage 220, or the like.

As discussed, a user may switch among the different modes by operating the mode button 232. Once in a particular mode, the set button 234 may be pressed to set the time, set the period for the count-down timer, or the like. To aid in the setting function, programming buttons 240a and 240b may be provided to allow the user to control the time up or down to the desired time setting. Clear button 236 is also provided to clear the time in the timing mode, stop watch mode, or the like. Also, start-stop button 238 is provided to start and stop timing in both the stop watch mode and the timer mode. These, of course, are just preferred operating controls and functions. Because the operation of timers, clocks and the like are know in the art, many alternative control systems could be used, as would be understood by one of ordinary skill in the art.

It should also be noted that the different modes can be operated simultaneously, such that the timer may be counting down a specified period indicating the useful life of the chaffing fuel canister, while the stop watch mode operates to keep track of elapsed time. In that case, the mode button 232 allows a user to switch between different modes to view these different items of information. In alternative embodiments, multiple displays may be provided so that a user may view all of the different modes simultaneously. Of course, any one of a number of other conventional timing systems may be used as dictated by manufacturing and design choices. Because timers are readily available from commercial establishments, a detailed description of the electronics for operating such timers will not be addressed. A preferred timing system is available from Taylor Instruments.

While the present invention has been described with respect to what is presently considered to be the preferred embodiments, the present invention is not limited to the disclosed embodiments. Rather, the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. A cart comprising:
a storage structure;
a cart base supporting said storage structure;
at least one swivel caster supporting said cart base, said swivel caster including a wheel base, said swivel caster swivelling on the wheel base about a substantially vertically extending axis;
a locking mechanism mounted to said wheel base of said swivel caster and engaging said swivel caster in a locked position to prevent swivel action thereof;
biasing means for biasing said locking mechanism toward the locked position;
an actuator operable (a) when actuated to move said locking mechanism from the locked position thereby to allow swivel action of said swivel caster, and (b) when deactivated to permit said locking mechanism to be biased toward the locked position by said biasing means to engage said swivel caster, so as to prevent swivel action thereof, when said swivel caster is rotated about its axis to a single predetermined position; and
operating means located on said cart base for operating said actuator.

2. The cart according to claim 1, wherein said swivel caster comprises a wheel and wherein said operating means is a pedal located on a side of said cart that is substantially parallel with the plane of rotation of said wheel of said swivel caster when said swivel caster is in the locked position.

3. The cart according to claim 1, wherein said operating means is operated with a user's foot.

4. A cart comprising:
a cabinet for storing food items;
a cart base supporting said cabinet;
a pair of trailing end swivel casters supporting said cart base;
a pair of leading end swivel casters supporting said cart base, each of the pair of leading end swivel casters comprising a rotatable wheel;
a locking mechanism movable to a locked position for locking each of said leading end swivel casters against swivel action in a single predetermined position in which the planes of rotation of said wheels of said leading end swivel casters are substantially parallel;
biasing means for biasing said locking mechanism toward said locked position;
an actuator only operable between two conditions wherein (a) when actuated said actuator moves said locking mechanism from the locked position to allow swivel action of said leading end swivel casters and (b) when deactivated said actuator permits said locking mechanism to be biased by said biasing means toward the locked position, and engage said leading end swivel casters so as to prevent swivel action thereof, each time said leading end swivel casters are moved to the predetermined positions; and operating means located on said cart base for operating said actuator.

5. The cart according to claim 4, wherein said operating means is located on a side of said cabinet substantially parallel with the planes of rotation of said wheels of said leading end swivel casters, when said leading end swivel casters are locked in the predetermined positions.

6. The cart according to claim 4, wherein said operating means is operated with a user's foot.

7. A cart comprising:
a storage structure having opposing first and second ends, and being arranged to be typically maneuvered from said first end;
a cart base supporting said storage structure;
at least one first swivel caster supporting said cart base at a first end and swivelling about a substantially vertically extending axis;
at least one second swivel caster supporting said cart base at a second end and swivelling about a substantially vertically extending axis;
a locking mechanism engaging said second swivel caster in a locked position to prevent swivelling thereof;
biasing means for biasing said locking mechanism toward the locked position;
an actuator only operable between two conditions wherein (a) when actuated said actuator moves said locking mechanism from the locked position thereby to allow swivel action of said swivel caster, and (b) when deactivated said actuator permits said locking mechanism to be biased toward the locked position by said biasing means to engage said swivel caster, so as to prevent swivel action thereof, each time said swivel caster is rotated about its axis to a single predetermined position; and
operating means located on said cart base for operating said actuator.

8. The cart according to claim 7, wherein said second swivel caster comprises a wheel and wherein said operating means is a pedal located on a side of said cart that is substantially parallel with the plane of rotation of said wheel of said swivel caster when said swivel caster is in the locked position.

9. The cart according to claim 7, wherein said operating means is operated with a user's foot.

* * * * *